United States Patent Office 3,037,739
Patented June 5, 1962

3,037,739
SINGLE BODY, SINGLE OPERATOR, DOUBLE SEATED VALVE WITH PREDETERMINED SEQUENTIAL VALVE SEATING ARRANGEMENT
Donald L. Stolp, Hickman Mills, Mo.
(9509 Newton, Kansas City 34, Mo.)
Filed June 22, 1959, Ser. No. 821,786
2 Claims. (Cl. 251—210)

Summary of Invention

The invention for which a patent is being applied incorporates two distinct inner valves into a single valve body and utilizes a single valve operator which allows predetermined, sequential opening and closing of each inner valve.

Description of the Drawing

The drawing submitted as part of this application shows a partially sectionalized view of the valve for which the applicant seeks a patent. The valve is shown in the fully-closed position. Visualization of the fully-open position can be attained by considering the plunger, part 19, to be moved upward by the valve operator such that the port contained in the lower packing gland, part 15, and the upper port contained in the plunger, part 19, are in complete coincidence.

Detailed Description of Invention

Figure 1:
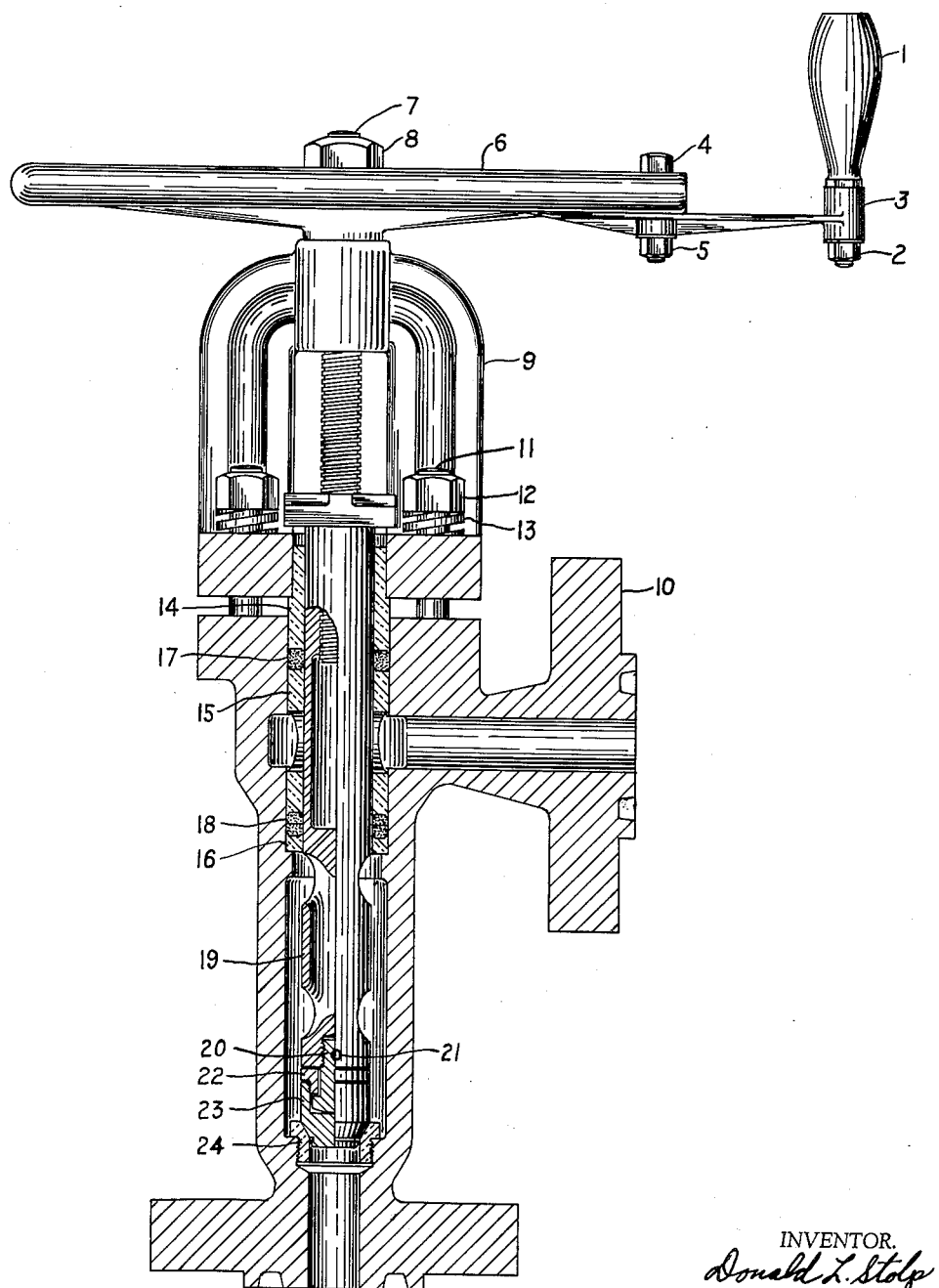

The invention for which a patent is being applied incorporates two distinct inner valves, a disc and seat inner valve and a ported sleeve inner valve, into a single valve body and utilizes a single valve operator which opens and closes the two inner valves in a predetermined, sequential manner.

Although the drawing submitted with the invention shows a manual jackscrew type of operator, the inventor does not desire to limit his patent solely to this type of operator. It is conceivable that any type of operator which can give straight line rectilinear motion to the plunger, part 19, can be utilized, when properly adapted, for the operation of the two inner valves.

Furthermore, although the drawing submitted with the invention shows a cone type disc and seat inner valve, the inventor does not desire to limit his patent solely to this type of inner valve. It is conceivable that other existing types or as yet unconceived types of disc and seat inner valves, regardless of inner valve geometry or materials of construction, but which can be adapted to the valve body, part 10, and the valve plunger, part 19, could be utilized.

The individual parts as numbered on the drawing have the following names:

| Part number: | Part name |
|---|---|
| 1 | Handwheel extension handle. |
| 2 | Handwheel extension handle retaining nut and lock washer. |
| 3 | Handwheel extension arm. |
| 4 | Handwheel extension arm retaining bolts. |
| 5 | Handwheel extension arm retaining nut. |
| 6 | Handwheel. |
| 7 | Jackscrew. |
| 8 | Handwheel retaining nut. |
| 9 | Yoke. |
| 10 | Valve body. |
| 11 | Yoke retaining studs. |
| 12 | Yoke retaining nuts. |
| 13 | Yoke springs. |
| 14 | Upper packing gland. |
| 15 | Lower packing gland. |
| 16 | Lower packing ring retainer. |
| 17 | Upper packing ring. |
| 18 | Lower packing rings. |
| 19 | Plunger. |
| 20 | Plunger extension. |
| 21 | Plunger extension retaining pin. |
| 22 | Disc lock nut. |
| 23 | Disc. |
| 24 | Seat. |
| 25 [1] | Upper yoke bearing. |
| 26 [1] | Lower yoke bearing. |

[1] These parts are not discernible on the drawing submitted with the patent application.

The mode of operation of the invention for which a patent is being applied is as follows:

(1) The disc and seat inner valve located near the valve body inlet is used as a final seal between the fluid on the inlet side of this inner valve and its outlet side. The inner valve does not move off its seat or onto its seat until all flow has been stopped by the ported sleeve valve. The disc and seat valve is considered in the fully-open position both just before the ported sleeve valve opens and just after the ported sleeve valve closes.

(2) The ported sleeve valve serves as a second inner valve which opens to allow fluid to flow and closes to stop the fluid flow through the valve. The ported sleeve valve absorbs the pressure throttling during both opening and closing of the valve. The ported sleeve valve may be used as a throttling valve.

The context of the word "upper" as it is used in the following detailed description of the invention is used to mean the direction toward the upper end of the enclosed drawing.

The disc and seat valve is used as a sealing valve at the valve inlet. The disc and seat valve consists of the seat, part 24, which is attached to the valve body, part 10, by any one of a number of methods such as threading in, rolling, welding in, or etc. The disc, part 23, is attached to the plunger, part 19, by means of the plunger extension pin, part 21, and the disc lock nut, part 22.

The ported sleeve valve is used as a secondary sealing valve and absorbs the greater part of the pressure throttling during the opening and closing of the two inner valves and thereby the ported sleeve valve suffers a greater amount of material erosion than the disc and seat inner valve. The ported sleeve valve may also be used as a throttling valve with little or no effect on its sealing ability. The ported sleeve valve consists of an inner port and sleeve which are incorporated into the plunger, part 19, and an outer port and sleeve which are incorporated into the lower packing gland, part 15.

The lower seal between the valve body, part 10, and the plunger, part 19, forms a seal between the valve body cavities above the disc and seat inner valve and the valve body outlet while the ported sleeve valve is in the closed position, and consists of the lower packing ring retainer, part 16, and the lower packing gland, part 15, which apply pressure to and deform the lower packing rings, part 18, against the valve body, part 10, and the plunger, part 19.

The upper seal between the valve body, part 10, and the plunger, part 19, forms a seal between the valve body cavities and the atmosphere external to the valve body, part 10, and consists of the lower packing gland, part 15, and the upper packing gland, part 14, which apply pressure to and deform the upper packing ring, part 17, against the valve body, part 10, and the plunger, part 19.

The straight line rectilinear motion required for opening and closing of both inner valves is provided by the plunger, part 19, which is actuated by means of the male threads on the jackscrew, part 7, and the female threads incorporated into the upper portion of the plunger, part 19. Also incorporated into the upper portion of the plunger, part 19, are guide followers which ride on guides incorporated into the yoke, part 9, and which prevent the plunger, part 19, from rotating when actuated by the jackscrew, part 7.

The plunger, part 19, also serves as a stem for the seat, part 24, and as the inner sleeve and port of the ported sleeve valve as well as a fluid passage between the valve body cavities above the disc and seat valve and the ported sleeve valve.

The yoke, part 9, serves to balance the thrusts of and torques from the jackscrew, part 7, and the plunger, part 19. These thrusts and torques are balanced in turn by the valve body, part 10, by means of the yoke retaining studs, part 11, the yoke springs, part 13, and the yoke retaining nuts, part 12. The yoke, part 9, serves to hold the upper yoke bearing, part 25, and the lower yoke bearing, part 26, which minimizes the turning friction caused by the thrusts applied by the jackscrew, part 7, to the yoke, part 9, via the handwheel, part 6, and upper yoke bearing, part 25, and the lower yoke bearing, part 26. The yoke, part 9, has incorporated into it guides which prevent the plunger, part 19, from rotating during its actuation. The yoke, part 9, exerts force on the upper packing gland, part 14, which is transmitted to the upper packing ring, part 17, and to the lower packing rings, part 18, via the upper packing ring, part 17, and the lower packing gland, part 15.

The jackscrew, part 7, serves to actuate and to transmit thrust forces from the plunger, part 19, either directly via the lower yoke bearing, part 26, in the case of upward thrusts or indirectly via the handwheel retaining nut, part 8, the handwheel, part 6, and the upper yoke bearing, part 25, in the case of the downward thrusts. The jackscrew, part 7, is fitted with a threaded upper end which together with the handwheel retaining nut, part 8, holds the handwheel, part 6, on the jackscrew, part 7.

The handwheel, part 6, the handwheel extension handle, part 1, the handwheel extension handle retaining nut and lock washer, part 2, the handwheel extension arm, part 3, the handwheel extension arm retaining bolts, part 4, and the handwheel extension arm retaining nut, part 5, all serve as a unit to transmit manually applied torque to the jackscrew, part 7. The jackscrew, part 7, is fitted with a shank which is square in cross section just below the upper threaded end of the jackscrew, part 7, and which mates with a square hole in the hub of the handwheel, part 6, for the purpose of transmitting the torque applied to the handwheel, part 6, to the jackscrew, part 7.

The applicant claims:
1. A valve comprising a body having first body cavity, a cylindrical body cavity communicating with said first body cavity at one end and open at its other end, a second body cavity in communication with the cylindrical body cavity, an inlet opening to said first cavity, a valve seat surrounding said inlet opening, an outlet opening from said second cavity, said cylindrical cavity having formed at its one end a shoulder and receiving there against a first packing retainer ring, a first packing ring positioned adjacent said first retainer ring, a first packing gland positioned adjacent said first packing ring, a second packing ring positioned adjacent said first packing gland, a second packing gland positioned adjacent said second packing ring which extends to the body exterior, said first packing gland having a port therein in communication with said second body cavity, a cylindrical valve member slidably and sealingly received within said glands and rings, said valve member being movable from a first position overlying said port and said packing rings to a second position uncovering said port and said first packing ring to control communication between said first cavity and said second cavity, a disc type valve positioned to control flow through said valve seat, means fixedly connecting said disc type valve to said cylindrical valve member for concurrent movement therewith, means for actuating said valves, said connecting means being of such a dimension in relationship to the distance between the port and the valve seat that upon movement of the valves from a closed position said disc type valve moves from said valve seat to a fully open position away from said seat before the cylindrical valve member uncovers the port in the first packing gland, and upon closing movement of the valves said cylindrical valve member covering completely the port in the first packing gland before the disc type valve seats upon the valve seat.

2. A valve as claim 1, wherein said connecting means constitutes a hollow and ported cylindrical sleeve element.

References Cited in the file of this patent

UNITED STATES PATENTS

| | | |
|---|---|---|
| 1,868,811 | Yarnall | July 26, 1932 |
| 2,037,497 | Burnham | Apr. 14, 1936 |
| 2,220,170 | Nelson | Nov. 5, 1940 |
| 2,489,623 | Delany | Nov. 29, 1949 |
| 2,525,989 | Works | Oct. 17, 1950 |
| 2,839,265 | Hobbs | June 17, 1958 |